United States Patent
Poplin

(10) Patent No.: US 7,071,456 B2
(45) Date of Patent: Jul. 4, 2006

(54) CAMERA MODULE WITH AMBIENT LIGHT DETECTION

(76) Inventor: Dwight D. Poplin, 1673 NW. Jackson Ave., Corvallis, OR (US) 97330

( * ) Notice: Subject to any disclaimer, the term of this patent is extended or adjusted under 35 U.S.C. 154(b) by 98 days.

(21) Appl. No.: 10/814,072

(22) Filed: Mar. 30, 2004

(65) Prior Publication Data

US 2005/0218303 A1 Oct. 6, 2005

(51) Int. Cl.
  *G01J 1/44* (2006.01)
  *H04N 5/57* (2006.01)
  *H05B 37/02* (2006.01)

(52) U.S. Cl. .................. 250/214 AL; 348/602

(58) Field of Classification Search ......... 250/214 AL; 348/602
See application file for complete search history.

(56) References Cited

U.S. PATENT DOCUMENTS 6,870,567 B1 * 3/2005 Funston et al. ........ 348/333.04

2002/0163524 A1 * 11/2002 Dutta ..................... 345/589
2003/0122810 A1 * 7/2003 Tsirkel et al. ............ 345/207
2003/0146372 A1 * 8/2003 Hsish et al. ............. 250/214.1
2005/0051708 A1 * 3/2005 Hotelling .............. 250/214 AL

FOREIGN PATENT DOCUMENTS

EP  1227642 A1 * 7/2002
JP  2003264725 A * 9/2003

* cited by examiner

*Primary Examiner*—Georgia Epps
*Assistant Examiner*—Brian Livedalen

(57) ABSTRACT

A camera module forms digital images and measures an ambient light level. A device such as a digital camera, a telephone, or a PDA containing the camera module can set lighting levels of I/O systems such as keypads or displays according to the ambient light level to thereby save power or optimize functionality of the I/O systems. A dedicated sensor in the camera module or one or more selected sensors in the imaging array of the camera module can measure the ambient light level.

10 Claims, 3 Drawing Sheets

CAMERA MODULE WITH AMBIENT LIGHT DETECTION

BACKGROUND

Camera modules can be made compact and energy efficient for use not only in digital cameras but also in other devices such as mobile telephones, personal digital assistants (PDAs), and laptop computers. In a mobile telephone, for example, the camera module performs imaging functions, and components such as a keypad, a controller, and a display are used for operation of both telephone functions and imaging functions of the camera module. In particular, the display that provides a visual user interface for telephone configuration or text messaging can show an image from the camera module, and the keypad and controller that are used for making telephone calls can also control and activate the camera module. However, the camera modules in such applications have generally been limited to imaging functions.

A common concern in portable devices, with or without camera modules, is power consumption. Components such as LCD displays or illuminated keypads, for example, consume power when the backlighting is activated. To conserve power and increase the time between required recharging of batteries, many portable systems such as mobile telephones turn off the backlighting after a short period of user inactivity. Additionally, the backlighting level may be under user control to permit use of lower intensity backlighting to conserve power when ambient lighting conditions permit. For example, backlighting for a keypad can be decreased or turned off when the ambient light level is high.

An ongoing goal for portable devices is to increase or improve the functionality of the devices while still providing an adequate operating time before batteries must be recharged.

SUMMARY

In accordance with an aspect of the invention, a camera module in addition to performing imaging functions senses ambient light levels. Using the camera module's measurement of the ambient light, a device containing the camera module can select operating settings such as a lighting level for a display. Accordingly, a camera module provides both imaging and sensing functions for energy-efficient portable systems or for improved functionality.

One specific embodiment of the invention is a device such as a digital camera, a mobile telephone, a PDA, or a portable computer that includes a camera module for capturing digital images. Such a device generally includes one or more I/O systems such as a keyboard or a display, and a controller is connected to the camera module and the I/O system. In operation, the controller can set (e.g., turn on or off or vary the level of) the lighting of the I/O system in response to a signal from the camera module indicating an ambient light level.

The camera module generally includes an array of pixel sensors, and the signal from the camera module indicating the ambient light level can be based on an intensity measured by a selected one of the pixel sensors or alternatively measured by a dedicated ambient light sensor in the camera module. When a pixel sensor is used for ambient light measurements, a green pixel sensor is preferred so that the measured ambient light level corresponds to light for which the human eye has the greatest sensitivity.

Another specific embodiment of the invention is a method for operating a device containing a camera module. The method includes operating the camera module to measure an ambient light level and then adjusting lighting of an I/O system such as a keypad or a display according to the ambient level measured by the camera module. The camera module can also be used to create a digital image that can be displayed on the I/O system. One technique for operating the camera module to measure the ambient light activates a pixel sensor (e.g., a green pixel sensor) in a sensing array of the camera module and measures the ambient light using the activated pixel sensor. Alternatively, the camera module can measure ambient light using a dedicated ambient light sensor.

Yet another specific embodiment of the invention is a camera module including an array of pixel sensors and a dedicated ambient light sensor. Generally, the array of pixel sensors and the dedicated ambient light sensor can be integrated into the same semiconductor chip.

BRIEF DESCRIPTION OF THE DRAWINGS

Use of the same reference symbols in different figures indicates similar or identical items.

DETAILED DESCRIPTION

In accordance with an aspect of the invention, a camera module can be used for both imaging and ambient light measurement. Accordingly, a device containing the camera module can form images and sense ambient lighting conditions. Automatic configuration of system settings based on the measured ambient light then provides optimal performance for current ambient light levels and reduces power consumption when possible. In one configuration, the ambient light sensing capabilities of the camera module reside in a dedicated sensor that is separate from the imaging array. The ambient light sensor and the imaging array are generally of similar construction, which allows efficient integration of separate sensors in a single integrated circuit. Alternatively, an imaging array in the camera module can perform both imaging functions and ambient light sensing.

Figure 1:
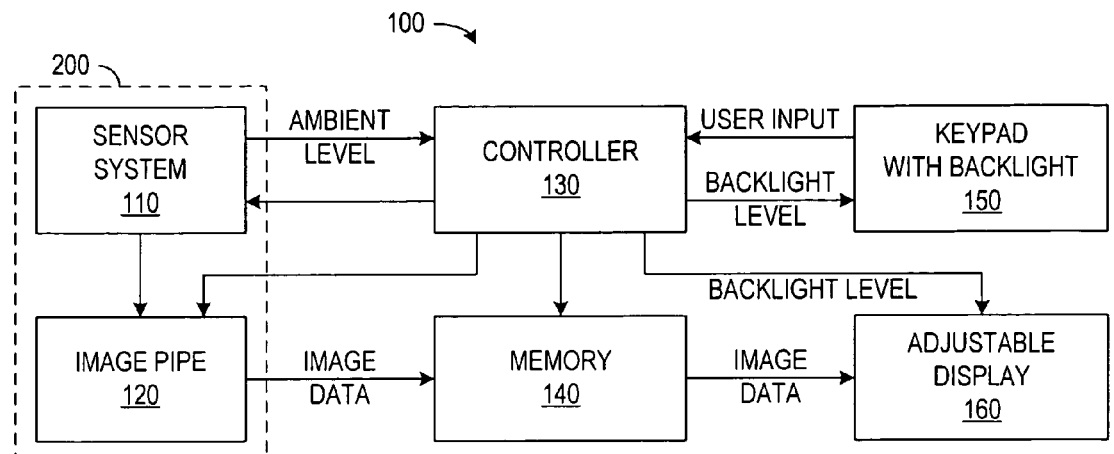
FIG. 1 is a block diagram of a device in accordance with an embodiment including a camera module that provides ambient light measurements.

FIG. 1 shows a block diagram of a typical device 100 containing a camera module 200. Device 100 can be any type of device having imaging capabilities. In particular, device 100 can be a digital camera, a mobile telephone, a personal digital assistant (PDA), or a portable computer. In a preferred embodiment of the invention, device 100 is portable and relies on a limited power source such as a battery (not shown), and ambient light level detection enables power savings that can extend the useful operating period between recharges of device 100. However, ambient light sensing can also be used for automatic adjustment of system parameters such as backlighting levels, which can optimize functionality of device 100 even when device 100 is connected to a power source (e.g., a power grid) where power saving is less of a concern.

As illustrated in FIG. 1, device 100 includes camera module 200, a controller 130, a memory 140, a keypad 150, and a display 160. Camera module 200 includes a sensor system 110 and an image pipe 120. Sensor system 110 performs image sensing and ambient light measurements. Image sensing is a well-known process that can be implemented in sensor system 110 using any conventional sensing arrays such as a charge-coupled device (CCD) imaging array or a CMOS imaging array.

Conventional image sensing techniques typically use a lens system (not shown) to form an image on an array of sensors that include photodiodes. For color imaging, each photodiode has a corresponding color filter, e.g., a red, green, or blue filter, so that current through the photodiode depends on the intensity of the incident light having the color that the filter selects. Each photodiode is connected to a capacitive node and charges or discharges the voltage on the node at a rate that depends on the intensity of the measured light. After a sensing time, the voltages from the capacitive nodes can be read from every sensor in the array and processed, for example, by subtracting zero level voltages from the raw voltages, amplifying the voltages, and/or converting the amplified or corrected voltages to digital values. Image pipe 120 can further process the resulting digital values, for example, for color interpolation, color correction, gamma correction, and image sharpening. Controller 130, which can be a conventional microcontroller or microprocessor, can perform additional processing of image data if desired before using display 160 to display the image represented in the image data.

In accordance with an aspect of the invention, camera module 200 also measures the ambient light level. FIG. 1 illustrates an embodiment of the invention where sensor system 110 bypasses image pipe 120 and directly outputs a signal representing the ambient light level. Bypassing image pipe 120 can conserve power particularly since the ambient light levels can be measured using one or a relatively small number of sensors. The ambient light level signal can be output as either a digital signal or an analog signal that is refreshed at a relatively low rate, e.g., once per second or when requested by controller 130. Although FIG. 1 illustrates direct input of the ambient light signal from sensor system 110 to controller 130, other signaling techniques such as storing a digital ambient light level in memory 140 or a register (not shown), could provide an ambient light level value when required for use by controller 130.

Controller 130 generally executes software or firmware that controls system components such as camera module 200, keypad 150, and display 160 and implements a user interface. In particular, controller 130 can control the power use or the lighting level of I/O systems such as keypad 150 and display 160 as needed for optimal user convenience and/or minimal power use. For example, controller 130 can turn off backlighting of keypad 150 if the ambient lighting level is high or turn on backlighting of keypad 150 if the ambient light level is too low for reading of the keys. Similarly, controller 130 can adjust the power level of display 160 according to the current ambient lighting level.

Figure 2A:
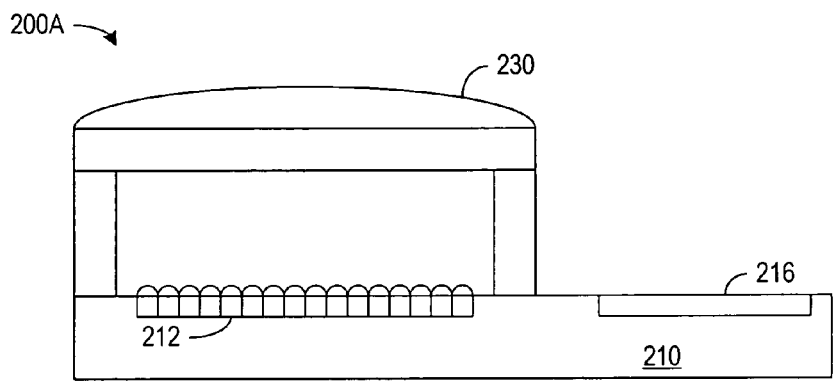
FIG. 2A shows a camera module in accordance with an embodiment of the invention that uses an imaging array for ambient light measurement and capturing digital images.

Camera module 200 can measure the ambient lighting level using either the imaging array that is otherwise used for imaging or using a dedicated ambient light sensor that is separate from the imaging array. FIG. 2A illustrates a camera module 200A that includes an integrated circuit chip 210 containing a sensor array 212 suitable for digital imaging and for sensing ambient light levels. In the illustrated embodiment, a lens 230 is part of an imaging system that forms an image on sensor array 212, and an array of hemispherical or semi-cylindrical microlenses 224 focuses light from pixel-size areas onto active areas of the photodiodes in sensor array 212. Associated circuitry 216 in chip 210 implements imaging functions such as analog signal amplification, analog-to-digital conversion, and the normal functions of an image pipe.

Camera module 200A activates one or only a small number of pixel sensors in sensor array 212 when performing an ambient light measurement. To be able to capture images and alternatively activate a small number of pixel sensors, a timing generator for sensor array 212 can operate in a capture mode for taking pictures and a sensing mode for ambient light sensing.

Figure 3A:
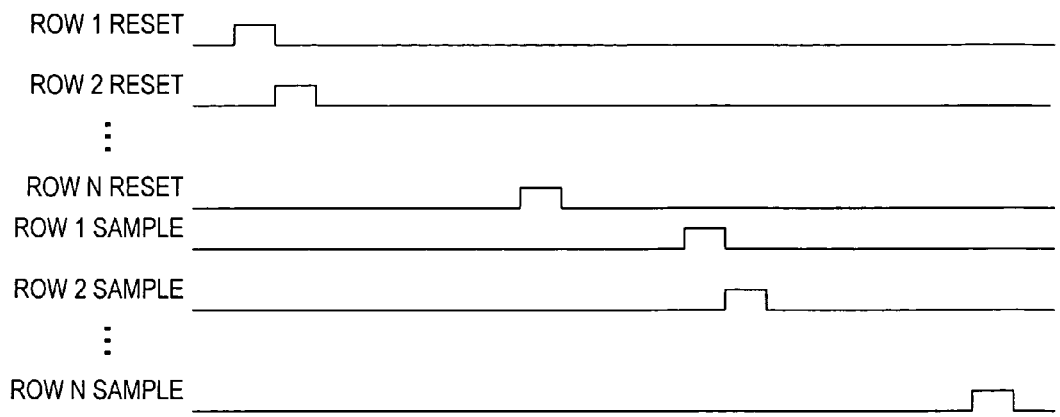
FIGS. 3A and 3B show timing diagrams for operating an image sensor in a camera module respectively in a capture mode and a sensing mode in accordance with an embodiment of the invention.

FIG. 3A shows typical timing diagrams for control signals generated in capture mode of a CMOS image sensor containing N rows of pixel sensors. For the timing diagram of FIG. 3A, each row of pixel sensors in the imaging array has a reset line for activation of reset circuitry in each pixel sensor in the row and a sample line for voltage output from the pixel sensors in the row to respective column lines. When a reset signal on the reset row line is activated, each pixel sensor in the row charges a corresponding capacitive node to a reset voltage level. Photodiodes in the row then begin to discharge the capacitive nodes at rates that depend on the light intensities incident on the photodiodes in the row. With the timing of FIG. 3A, the N rows of pixel sensors are sequentially reset. After a sensing or integration time has passed for a row of pixel sensors, a sample signal on the sample line for the row is asserted, and the pixel sensors in the selected row drive column lines at levels that indicate the integrated voltages remaining on the respective capacitive nodes. Sample-and-hold circuits respectively coupled to the column lines can then sample the raw output voltage for zero level subtraction and/or analog-to-digital conversion. Sampling continues row-by-row until voltages have been read from all pixel sensors in the imaging array.

Figure 3B:
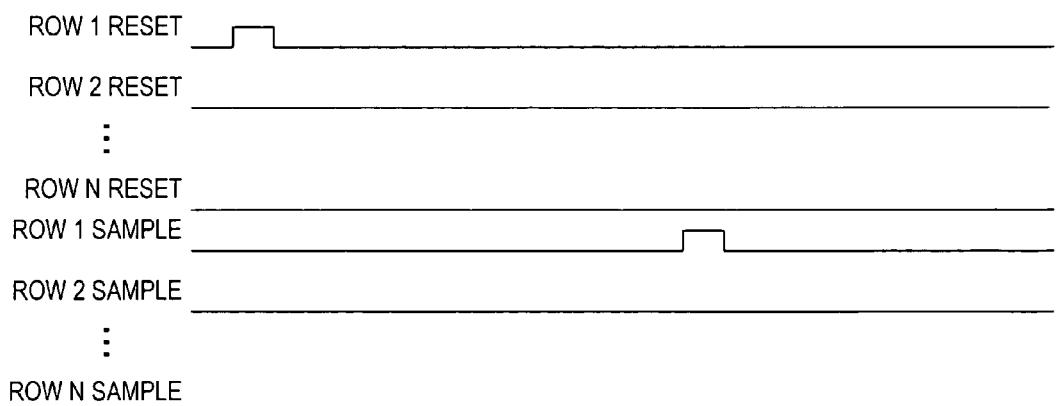

The sensing mode, as mentioned above, only activates a limited number of pixel sensors for sensing of ambient light conditions. If desired, imaging optics (e.g., lens 230 of FIG. 2A) can be unfocused for ambient light detection so that the selected pixel sensor(s) can receive light from a wider angle. FIG. 3B illustrates typical timing diagrams for control signals generated in a sensing mode of the CMOS image sensor. The timing of the sensing mode differs from the timing of the capture mode in that the sensing mode resets and then samples only one (or a small number) of the rows of pixel sensors in the sensing array. FIG. 3B illustrates an example where the activated row is the first row of pixel sensors, but alternatively, pixel sensors in the center or any row of the imaging array can be activated for ambient light sensing. Since only one or a few pixel sensors are activated in sensing mode, the timing generator and the imaging array consume less power in the sensing mode than in the capture mode. Further power savings can be achieved in the sensing mode by only activating one or a few of the sampling circuits connected to read out the raw integrated voltages on the column lines.

When ambient light sensing reads the raw voltage from only a single pixel sensor, the pixel sensor activated preferably corresponds to a photodiode under a green filter because the light that a green pixel sensor measures in a conventional color imaging array has about the same frequency as the light to which the human eye has the greatest sensitivity. Ambient light sensing that reads raw voltages from more than one pixel sensor preferably reads red, green and blue pixel sensors, and a linear transformation of those three values provides an accurate estimate of the luminance at the frequency of the light to which the human eye has the greatest sensitivity. The image pipe for the imaging array can perform the transformation. An ambient light sensor that senses light matching the frequency response of the human eye as described here generally provides a reliable indication of whether backlighting of an I/O system is necessary.

Figure 2B:
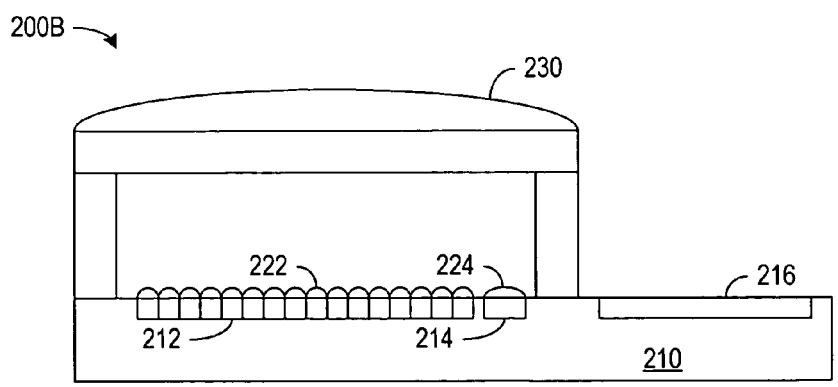
FIG. 2B shows a camera module in accordance with an embodiment of the invention having a dedicated sensor for ambient light measurement and an imaging array for capturing images.

FIG. 2B shows a camera module 200B in accordance with an embodiment of the invention including a dedicated ambient light sensor 214 for ambient light sensing in addition to sensor array 212 for imaging. Ambient light sensor 214 can be fabricated using the same process as used to fabricate the photodiodes in sensor array 212, but ambient light sensor 214 preferably has a larger photosensitive area. In one embodiment of the invention, ambient light sensor 214 includes a single photodiode covered with the same green filter material as covers the green pixels in sensor array 212. Alternatively, ambient light sensor 214 can include three dedicated photodiodes respectively covered with red, green, and blue filter materials. With three photodiodes, a linear transform can be performed to obtain an accurate measure of the luminance, but the relative sizes of the three photodiodes can be selected to simplify the transform.

FIG. 2B illustrates an embodiment where dedicated ambient light sensor 214 is adjacent to sensor array 212 and within an image field of the optical system including lens 230, which forms an image on sensor array 212. A light-collecting lens 224 focuses light from a larger area onto a light sensitive region of ambient light sensor 214. Alternatively, ambient light senor 214 can be outside the image field for sensor array 212 and may include additional light collecting optical elements (not shown).

Figure 4:
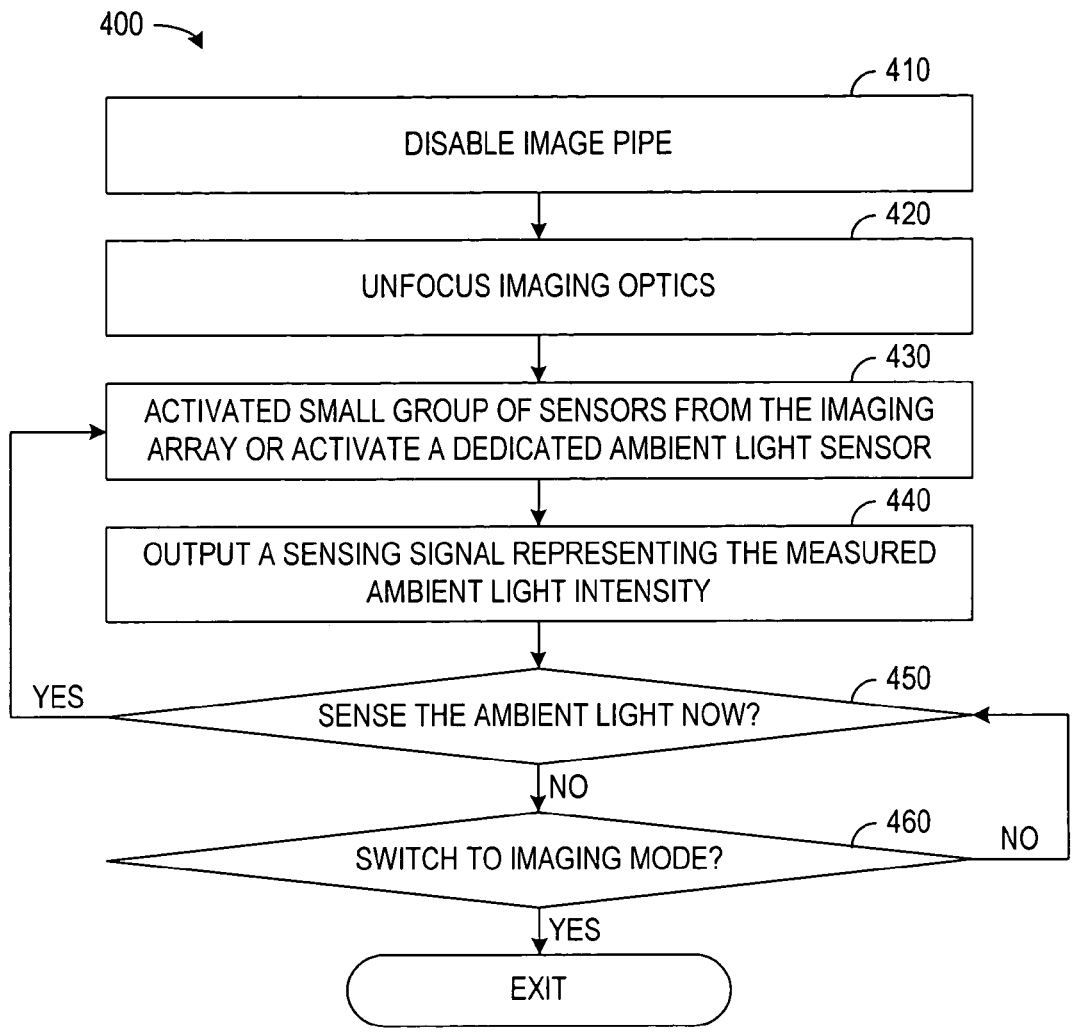
FIG. 4 is a flow diagram for a process in an embodiment of the invention where a device uses a camera module for ambient light measurements and adjusts lighting of an I/O system according to the ambient light measurements.

FIG. 4 is a flow diagram of a process 400 for a camera module measuring an ambient light level. Process 400 begins when the camera module enters an ambient light-sensing mode. Typically, a controller for the device including the camera module can initiate ambient light sensing and control the camera module during process 400. For ambient sensing, steps 410 and 420 disable the image pipe, if it is not used when sensing ambient light levels, and unfocus the imaging system so that the target pixel sensor or dedicated ambient light sensor senses light from a wide angle or area.

Measurement of the ambient light begins in step 430 with the activation of one or more pixel sensors from the sensor array or activation of a dedicated ambient light sensor. A photodiode associated with the activated sensor then begins to discharge or charge a corresponding capacitive node at a rate that depends on the intensity of light incident on the photodiode. After the required sensing time, step 440 outputs a signal indicating the integrated intensity of the ambient light over the sensing interval.

Decision step 450 implements a delay determining whether another measurement of the ambient light level should be performed. If, for example, the amount of time since the last measurement of the ambient light level is equal to or greater than a desired period for ambient light sensing, process 400 branches from step 450 back to step 430. Otherwise, process 400 proceeds from step 450 to a decision step 460.

Decision step 460 determines whether the camera module is needed for imaging. If the camera module is needed for imaging, process 400 ends and the camera module exits the ambient light sensing mode. If imaging is not required, process 400 branches back from decision step 460 to decision step 450 to determine whether to measure the ambient light level again.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A device comprising:
    a camera module, wherein the camera module comprises an array of pixel sensors;
    an I/O system; and
    a controller connected to the camera module and the I/O system, wherein the controller sets power consumption of lighting of the I/O system in response to a signal from the camera module indicating an ambient light level, and the signal from the camera module indicates an intensity measured by a selected one of the pixel sensors in the array.

2. The device of claim 1, wherein the I/O system comprises a lighted keypad, and the controller sets the lighting of the lighted keypad in response to the signal from the camera module.

3. The device of claim 1, wherein the I/O system comprises a display, and the controller sets the lighting of the display in response to the signal from the camera module.

4. The device of claim 1, wherein the controller turns off the lighting in response to the signal from the camera module indicating that the ambient light level is high.

5. The device of claim 1, wherein the pixel sensors in the array have associated color filters, and the selected one of the pixel sensors has a green color filter.

6. A method for operating a device, comprising:
    operating a camera module to measure an ambient light level, wherein operating the camera module comprises:
    activating a pixel sensor in an imaging array of the camera module, wherein pixel sensors in the array have associated color filters, and the pixel sensor activated has a green filter; and
    measuring the ambient light using the pixel sensor activated; and
    adjusting power consumption of lighting of an I/O system according to the ambient light level measured by the camera module.

7. The method of claim 6, wherein adjusting the lighting comprises adjusting the lighting of a lighted keypad according to the ambient light level measured by the camera module.

8. The method of claim 6, wherein adjusting the lighting comprises adjusting the lighting of a display according to the ambient level light measured by the camera module.

9. The method of claim 8, further comprising:
    operating the camera module to create a digital image; and
    displaying the digital image on the display.

10. The method of claim 6, further comprising operating the camera module to create a digital image.

* * * * *